(No Model.)

E. T. & E. E. STARR.
SECONDARY OR STORAGE BATTERY.

No. 276,300.  Patented Apr. 24, 1883.

WITNESSES:
Wm A. Skinkle
James Young

INVENTORS:
E. T. Starr & E. E. Starr,
By their Attorney
Wm J. Peyton.

UNITED STATES PATENT OFFICE.

ELI T. STARR AND E. EUGENE STARR, OF PHILADELPHIA, PA., ASSIGNORS OF ONE-HALF TO WILLIAM J. PEYTON, OF WASHINGTON, D. C.

SECONDARY OR STORAGE BATTERY.

SPECIFICATION forming part of Letters Patent No. 276,300, dated April 24, 1883.

Application filed December 5, 1882. (No model.)

*To all whom it may concern:*

Be it known that we, ELI T. STARR and E. EUGENE STARR, both of the city and county of Philadelphia, in the State of Pennsylvania, have jointly invented certain new and useful Improvements in Secondary or Storage Batteries, of which the following is a specification.

Our invention relates to the class of batteries for producing or generating electricity known as "secondary" or "storage" batteries. These batteries are charged or put into condition for generating electric currents by the action of a current of electricity evolved by a generator and caused to flow through the battery, the work of the charging-current being recovered, when desired, by connecting the electrodes of the battery by an electric conductor.

The object of our present invention is to provide an improved secondary or storage battery, and to render more economical, certain, and effective the results sought to be accomplished by such batteries.

The subject-matter claimed is particularly pointed out at the close of the specification.

It is to be understood that some of our present improvements may be used without the others, and in batteries different from that particularly shown in the accompanying drawings, which drawings show all our said improvements as embodied in one battery in the best way known to us at the date of filing our application of December 31, 1881. This present application is a division of our said application of December 31, 1881, and is restricted to the claims particularly recited at the close of this specification. We disclaim herein all other parts of our invention described or substantially indicated in this case in favor of our said application of 1881.

Figure 1:
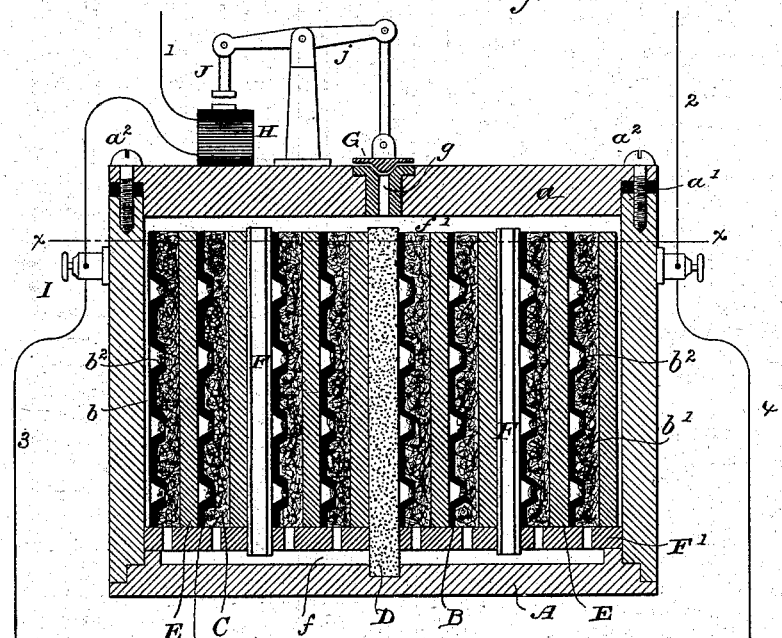
Figure 2:
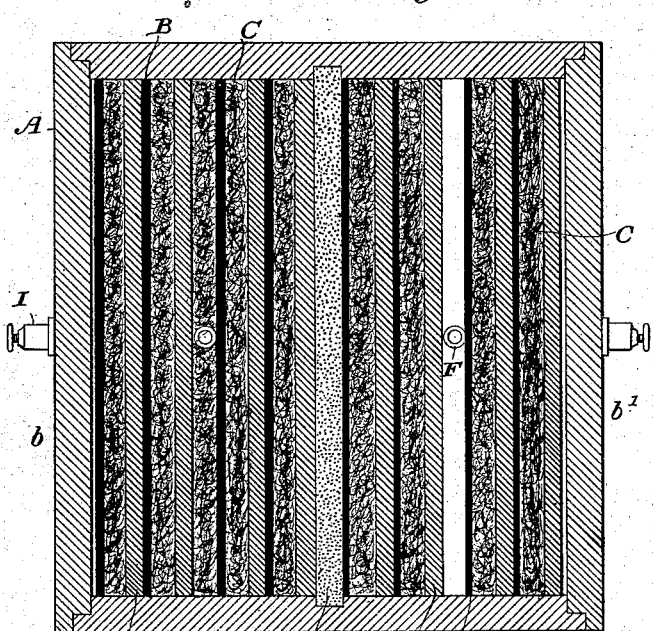

Figure 1 is a vertical central section through the improved secondary or storage battery, and Fig. 2 is a horizontal section therethrough on the line $x\ x$ of Fig. 1.

The body of the vessel or box A of the battery is constructed preferably of the oblong rectangular shape shown in the drawings, and of material which is a non-conductor of electricity, such as glass, hard rubber, or gutta-percha. When the vessel A is so constructed we preferably strengthen it by a surrounding casing or envelope of some stout material, in order to give support to the vessel and protect it during transportation. The open end or top of the vessel A is provided with a closely-fitting non-conducting lid or cover, $a$, and between the edges of said vessel and said lid or cover we interpose a packing material, $a'$. The lid or cover is fastened securely and tightly in place, so as to make the chamber of the vessel or box air-tight, and this is done by means of suitable fastening devices, shown as consisting in this example of screws $a^2$, passing down through the lid or cover into the walls or sides of the body of the vessel. By making the battery-vessel air-tight greater ease and safety in handling are permitted, among other advantages.

Within the air-tight chamber of the vessel or box are arranged the positive and negative elements or electrodes of the battery, together with the substance (an electrolytic fluid, usually acidulated water) to be acted upon by the charging-current, in order to place the battery in condition to generate electricity when the poles or electrodes of the battery are connected in circuit by a conductor.

The electrodes preferably consist of lead plates B, the positive and negative plates being preferably, respectively, of different thickness or size; or the positive and negative plates may be of different metal—as, for example, the positive plates may be of lead and the negative plates of palladium. We prefer to construct the positive plates of greater thickness than the negative plates, in order to enable the positive plates to withstand the contortions or changes of shape to which they are especially liable to undergo during the formation of the battery. The increased durability and strength of the positive plates may be imparted to them in various ways. The plates B in both the positive and negative series we prefer to be in the form of sieves, or with holes or depressions made therein. If thin plates are used as the electrodes, they may be indented or depressed by a pointed tool, so as merely to stretch the metal without completely perforating it. We prefer, however, this sieve or perforated form of plate, as it affords greater surface to receive the material with which the plate is coated or supplied, and which is to be affected by the charging-current through the decomposition of the electrolytic liquid of the cell. We prefer, also, to provide the battery-plates with recesses or receptacles for the reception of the aforesaid material, which is usually porous when active, and these recesses are clearly shown in Fig. 1, being formed by the walls of the projections $b^2$, through which the openings or perforations of the plate are made. By means of said recesses between the perforated projections the porous active material is more securely held to and supported upon the plate, and a larger amount of said material may be applied to the plate to be effectively acted upon or affected by the charging-current than if the plate had plain sides or were simply perforated, which construction is highly advantageous, in that it secures greater capacity with the same weight of battery for the accumulation or storage of the energy of the charging-current. This porous material, or material to be made porous or active, may be red oxide of lead, peroxide of lead, sulphate of lead, peroxide of manganese, or any equivalent thereof, moistened with dilute sulphuric acid, or with a salt in solution, (which does not chemically affect the oxides,) or any equivalent thereof, in order to form a paste. This paste so prepared, or the equivalent thereof, is thoroughly mixed or incorporated with fibers or fibrous material—such as raw cotton, for example—and is then spread upon the plates B in layers C, the thickness of which relatively to the thickness of the metal plates may be about as shown in Figs. 1 and 2 of the drawings; but the proportion may of course be varied. The fibers, by reason of their mixture with the oxide or its equivalent, become virtually conductors throughout the entire layer of the oxide, whereby it will be evident that a largely-increased surface of the oxide is presented to the action of the charging-current, and greater surface is afforded for the accumulation or deposit of what may be termed the "energy of the charging-current." Not only does the fiber act in the highly-beneficial manner indicated, but it enables a secondary battery of large capacity to be produced without too great weight, and it also acts to bind together the mass composing the active porous material, and also to make it cling or adhere to the plate, which are important features.

The positive and negative series of plates, (respectively marked $b$ and $b'$,) with their oxide or its equivalent, each constitute a compound battery plate or element, and are separated by a porous partition or plate, D, to constitute a resistance medium; or, in place thereof, a layer of felt, E, or some equivalent thereof, may be interposed between one side of each plate B of the compound positive and negative electrodes and their layers of oxide or oxide and fiber, as clearly shown in Figs. 1 and 2.

It will be seen that each electrode in the example shown is made up of a mass of finely-divided or porous active material, held and supported at its sides between the plates B, which plates are not solid, but, on the contrary, permit ready access through them of the electrolytic fluid, and also permit the ready action of the accumulating forces upon the active material. The edges of the active mass in the example shown are supported by the non-conducting sides of the battery-vessel and by the non-conducting frame or floor F', hereinafter described, and such a method of supporting the mass as we have described—to wit, at its sides by open plates and at its edges by a separate support—is in some cases preferable. Through each mass making up the positive and negative electrodes or elements we insert a preferably non-conducting tube, F, which may be of glass or hard rubber; or, in place of the tube, strips may be used to separate each mass, the prime object of which is to carry off or give comparatively free vent or escape to the surplus gases generated in the battery by the action of the charging-current, which gases, if not removed, prevent the ready accumulation of the energy of the said current.

At the lower end of the vessel A, above its bottom, is inserted a perforated plate or frame, F', which constitutes a partition or floor, upon which the interior parts of the battery rest. A space, $f$, is thus formed between said floor and the bottom of the vessel for a portion of the electrolytic fluid of the battery and for the free collection and upward escape of the gases unopposed by solid matter, and a like space, $f'$, is formed at the top of the battery, between the conducting-plates and oxide and the cover of the battery, for a similar purpose. The spaces or tubes F afford free communication between the top and bottom spaces, $f$ $f'$, of the battery, and the gases from below thus readily escape upward through the liquid of the battery, and the surplus thereof thus collects in the top space and escapes through a valve-opening, $g$, in the lid or cover when the valve G is raised from its seat or opened. Said valve G is automatically operated by the action of the charging-current, said current opening the valve to permit of the escape of the surplus gases which are generated during the charging of the battery, while the valve is automatically closed when the charging-current is cut off or ceases to flow to the battery. The charging-current flows from the generator to the battery through a line-wire, 1, which passes around a soft-iron core mounted on the top of the battery-cover to form an electro-magnet, H, and is then connected to a binding-screw, I. Said binding-screw is electrically connected with the series of plates constituting the compound positive electrode or element of the storage-battery. The charging-current thus passes through the positive and negative plates and their layers, C, of oxide and fiber, or its equivalent, and through the electrolytic fluid, or a portion thereof, and causes the chemical action which results in the storage or accumulation of energy by converting the positive pole or electrode into an oxygen element, and the negative pole or electrode into a hydrogen element, and said current then returns to the generator by way of wire 2.

It is evident that as soon as the charging-current begins to flow to the storage-battery the armature J of the electro-magnet H will be attracted and the valve G opened by means of the pivoted beam *j*, while as soon as the current is cut off the valve will be automatically closed by its weight, which is greater than that of the armature J. If desired, a spring may aid in the retraction of the armature in a common manner to return the valve to its seat to close the vent-opening *g*. As soon as the battery is sufficiently charged the connection with the generator is cut off.

When it is desired to generate a current of electricity by the storage-battery its electrodes are connected by a conductor.

We number this division of our application of 1881 "No. 2," for identification.

We claim herein as our invention—

1. A compound electrode for secondary batteries, consisting of a mass of finely-divided active material supported at its opposite sides between plates which permit access through them of the electrolytic fluid of the battery, and at its edges by a separate support, substantially as described.

2. A compound electrode for secondary batteries, consisting of a mass of finely-divided active material supported at its opposite sides between plates which permit access through them of the electrolytic fluid of the battery, and at its edges by a non-conducting support, substantially as described.

3. An electrode for electric batteries, consisting of a mass of finely-divided active material, perforated metal plates or supports at the sides of said mass to support it, and a separate support for the edges of said mass.

4. The combination, in a secondary battery, of electrodes, each consisting of a mass of finely-divided active material supported and held at its sides between supports which permit access through them of the electrolytic fluid of the battery, and at its edges by a separate support, with a porous partition or diaphragm between said electrodes, substantially as described.

In testimony whereof we have hereunto subscribed our names this 30th day of November, A. D. 1882.

ELI T. STARR.
     E. EUGENE STARR.

Witnesses:
 WM. J. PEYTON,
 JAMES YOUNG.